Jan. 2, 1968  J. I. OHRN  3,361,488
ENDLESS TRACK VEHICLE
Filed Dec. 1, 1965  2 Sheets-Sheet 1
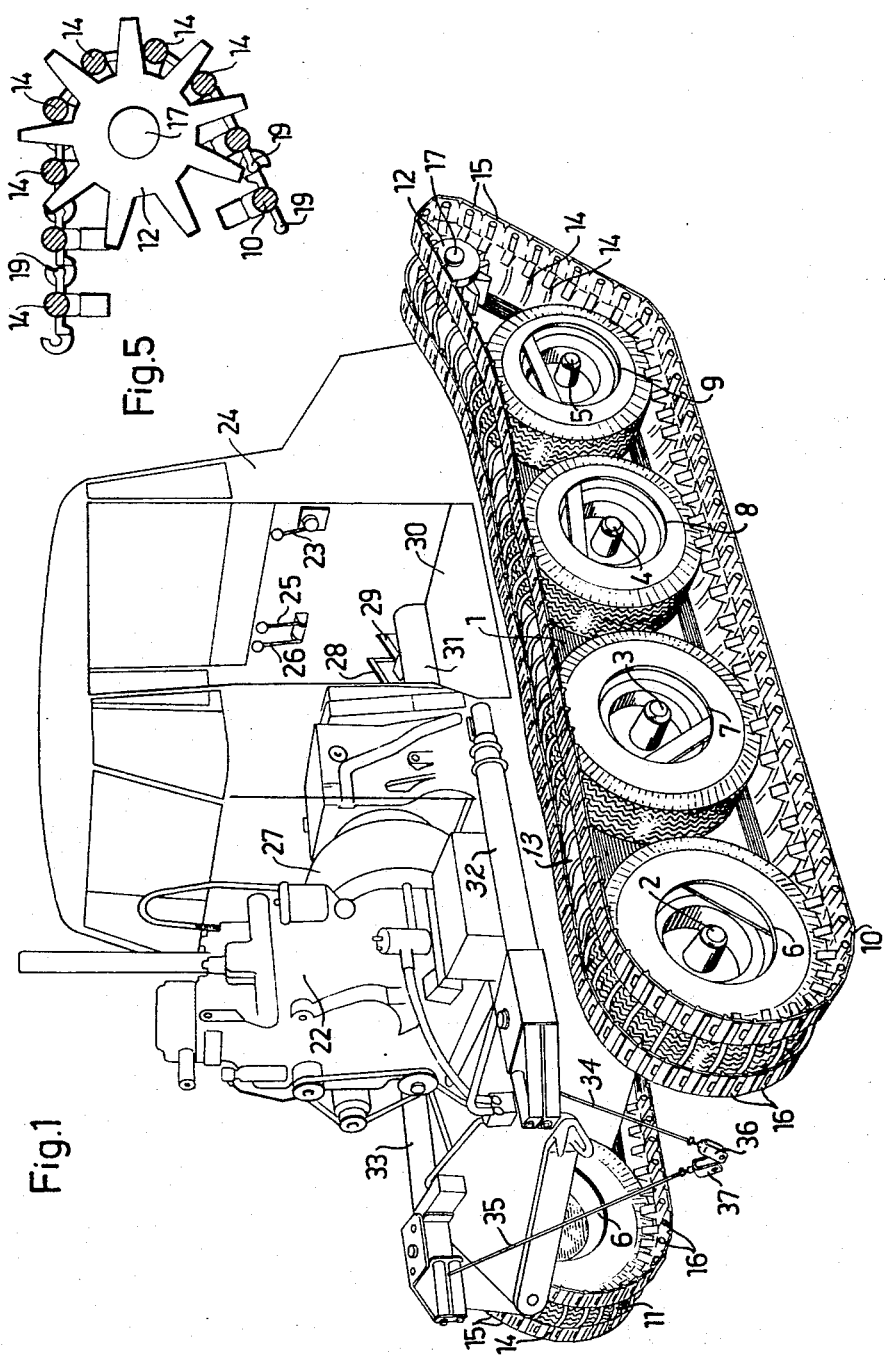

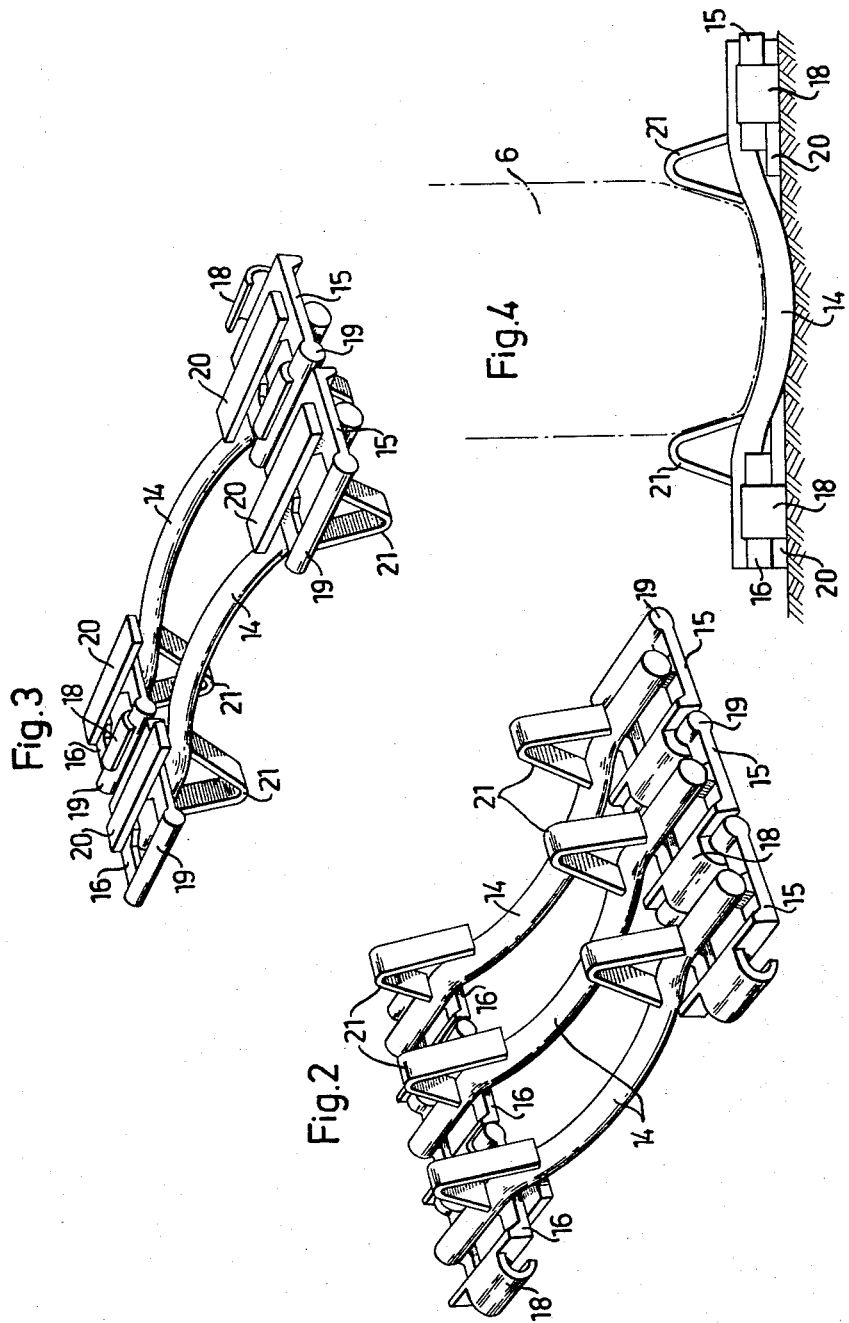

United States Patent Office 3,361,488
Patented Jan. 2, 1968

3,361,488
ENDLESS TRACK VEHICLE
John Ingemar Ohrn, Katrineberg, Sodertalje, Sweden, assignor to OMW-Maskiner KB, Katrineberg, Sodertalje, Sweden
Filed Dec. 1, 1965, Ser. No. 510,827
Claims priority, application Sweden, Dec. 3, 1964, 14,639/64
8 Claims. (Cl. 305—28)

ABSTRACT OF THE DISCLOSURE

A lightweight cross-country crawler tractor has unsprung rubber tired track wheels, a small drive sprocket above and in front of the track wheels, and crawler tracks. Each track is formed by transverse grouser rods arched in the center, and welded at their ends to pivotable links. Each link has a pin and sleeve on opposite ends. The grouser rods are welded to the links between the pivot points. Lugs welded to the inside of the links cooperate with the track wheels and flat plates on the outside of the links protect from rocks.

---

The present invention relates to endless track cross country vehicles and its aim is to provide a light-weight and low priced such vehicle with high tractive power both on broken and stony ground as well as on plane but loose ground, such as fields for instance.

One of the drawbacks of prior art endless track vehicles is that the crawler belts or tracks were provided with much too wide tread plates, i.e., too long links, which on the one end implies that the driving wheels arranged as track wheels have to be provided with large radii and, on the other hand, results in track belts of great lengths. As a consequence thereof the vehicle becomes of large dimensions and heavy weight and must therefore be provided with a powerful engine. Such a vehicle therefore entails high running costs due to the high fuel consumption as well as high maintenance costs.

Another drawback in prior art endless vehicles is that the long, wide and mainly plane link plates of the track of such vehicles involve a low specific surface pressure on the ground, which in turn results in insufficient grip so that the traction of such vehicles does not have the desired relation to the engine power.

The dimensions of such vehicles thus determined by the length of the links make it very difficult in prior art vehicles to incorporate the required propelling machinery within such small vehicle height dimensions so that the center of gravity of the vehicle will be high-placed, which may be very hazardous on broken ground.

The present invention has for its object to overcome such drawbacks by reducing the dimensions and weight of such vehicles to a minimum by providing them with a particularly suitable track link arrangement, the invention being essentially characterized in that the track is constituted by narrow transverse rods (grouser rods) interconnected at their ends by means of links, said rods being slightly arched for matching the profile of the track wheels of the vehicle, and made of resistant, comparatively resilient material such as for instance steel with low carbon contant (0.20–0.40% C).

According to another embodiment of the invention the links interconnecting the grouser rods to form a crawler track are constituted by the links of a so called Ewart chain, each of said links consisting of a rectangular frame, one end of which being arranged as a partly open sleeve, the opposite end being arranged as a pin insertable sideways into an adjacent link sleeve. The grouser rods are preferably arranged with a straight part at each end, said part being welded to a corresponding link. The straight parts of the grouser rods can be either welded onto the sleeves of the corresponding links in such a way that the extended centre line of the sleeve lies in the same plane with the centre line of the grouser rod arch crown, or welded onto the corresponding links half-way between the sleeve and the pin in such a way that the stresses transmitted by the grouser rod in operation are equally divided between the sleeve and the pin of the link. In order to prevent the link sleeves from being damaged by stones and the like and to prevent stones from becoming jammed in the link openings, a flat piece of steel is welded on each link on the side opposite to the grouser rod, said flat iron piece having such a thickness that its upper face slightly projects above the link sleeve.

In order to ensure that the track links are guided by the track wheels of the vehicle, flat iron lugs intended to engage the sides of the track wheel tires are welded on that side of the grouser rods which is directed away from the corresponding links. According to a further embodiment of the invention, none of the track wheels of the vehicle are propelling and each rear wheel is arranged to guide its track. All track wheels have preferably the same outer diameter as the rear wheels.

According to another embodiment of the invention the tracks are driven by means of driving sprockets which engage the grouser rods of the track, the centre line of said driving sprockets being arranged ahead of the track wheels and at such a height above tangent to the wheel tops that the pulling run of the track, when idle, will follow a chain line from the drive sprocket to the penultimate or the antepenultimate wheel while said track run, when pulling, forms a chain line from the drive sprocket to the rear wheel.

By providing a sprocket engaging the grouser rods of the track for driving the track, one obtains a particularly sturdy and robust actuating mechanism. Only one wide driving sprocket is required on either side of the vehicle and this sprocket can be provided with large and robust cogs. Furthermore, the driving sprocket can have a comparatively small diameter, which, in its turn, results in a favourable power transmission from the engine.

According to a further embodiment of the invention the track wheels of the vehicle are unsprung and the rear wheel axles are mounted on a sliding frame arranged to serve as a tensioning device for the crawler tracks. These features of the invention are of particular importance for preventing the track from slipping off the track as explained more in detail in the following description.

An important feature characterizing one embodiment of the invention is also that the spaces between the cogs of the driving sprockets have such a depth that in case the grouser rods are welded on the middle of the links, the latter may rotate around the pivots without the grouser rods bottoming in the cog spaces. The sprocket cogs are also preferably provided with spherically rounded flanks matching the arched grouser rods.

These and other advantageous objects will become apparent through a consideration of the following detailed description taken in conjunction with the attached drawings in which:

FIGURE 1 is a view of an endless track vehicle according to the invention,

FIGURES 2, 3 and 4 are different views of a number of track links according to the invention, and FIGURE 5 is a schematic view of a driving sprocket and a part of the track shown in section.

FIGURE 1 shows an embodiment of the invention in form of a light-weight cross-country endless track vehicle with high tractive power. On the chassis of the vehicle are mounted four unsprung axles 2, 3, 4 and 5 carrying track wheels 6, 7, 8 and 9 which are small-sized conventional motor car wheels with pneumatic tires. The wheels roll in track belts 10 and 11, which are run over driving sprockets 12 which mesh with interspaces 13 in the track belts constituted by transverse grouser rods 14 which are welded at both ends to track links 15 and 16.

The construction of the tracks will be described in more detail below with reference to FIGURES 2–4.

As it appears from the above, each track link is constituted by a grouser rod 14, an outer link 15 welded on the outwardly directed end of said rod and an inner link 16 welded on the inwardly directed end of said rod.

The driving sprockets 12 are of small diameter and provided with large cogs arranged to mesh with the track interspaces 13 formed between the grouser rods 14. This arrangement offers the advantage of a very sturdy structure of the whole propelling mechanism with robust cogs as well as a minimum wear of both the cogs and the grouser rods. The driving sprockets are mounted on a driving shaft 17 arranged at a substantial height, for instance 4 to 8 inches above a tangent to the track wheel tops and ahead of these wheels. Thus one gains the advantage that, on the one hand, the track run on top of the wheels will be the pulling run while the ground engaging run will be the pulled run and, on the other hand, the pulling run will substantially follow a chain line between the wheels of the penultimate or the ante-penultimate wheel and the corresponding driving sprocket, when idle, or between the rear wheel and a driving sprocket when the track is propelling. This is an advantage because the pulling run will have a certain track length reserve available for the ground engaging run when driving over stones and other irregularities of the ground in that the ground engaging run is arched over the obstacle between the track wheels, a feature ensuring an exceptionally strong grip of the track on the ground.

The link construction of the tracks is shown in more detail in FIGURES 2, 3 and 4. FIGURES 2 and 4 show the position of the track links in the ground engaging run, i.e., the pulled run of a track while FIGURE 3 shows the position of the links in the upper run, i.e., the pulling run of a track. The reference numerals are the same as in FIGURE 1. Transverse grouser rods 14 are thus provided, each of which is forming the links of the track together with outer links 15 and inner links 16 welded on the ends of the rods. In the embodiment of the invention shown on the drawing the inner and outer link elements 15 and 16 are constituted by the links of two Ewart chains, each of which includes a frame with two longitudinal frame edges perpendicular to the corresponding rod 14 and with two front edges, one of which is shaped as a sleeve or socket 18 and the other one as a pin 19 insertable in the socket 18 of an adjacent link.

In order to prevent the sockets 18 from being distorted, flat pieces 20 of steel are welded on that side of the links which is opposite to the grouser rods 14, the outer edge of said flat-iron pieces projecting above the sockets, thus preventing irregularities of the ground from damaging the socket. These pieces also prevent the stones from becoming jammed in the openings of the Ewart links and reinforce said links at the same time as they contribute to the grip of the track on the ground.

As can be seen in FIGURE 4 the arching of the grouser rods 14 provides on the one hand a matching engagement of the inside of the track against the track wheels 6–9 and, on the other hand, a very good grip on the ground surface. If the ground is very hard the contact surface between the rods and the ground is small, which results in a very high specific surface pressure and, consequently, a high resulting friction. If, on the contrary, the ground is soft, the arched part of the rods 14 will penetrate into the ground thereby ensuring a good grip in the ground.

In order to further improve the guiding of the tracks by the track wheels 6–9, bent guide lugs 21 are welded on the rod 14 between the connecting point of the rods to the corresponding links and the transition to the arched parts of the rods, said lugs being welded on that side of the rods, which is opposite to the links, whereby the inwardly directed sides of said lugs will be guided by the sides of the track wheel tire as shown in FIGURE 4 in which the profile of a wheel 6 is indicated with chain-dotted lines. As can be seen in FIGURES 2 and 3 as well as in FIGURE 1 the construction according to the invention makes it possible to provide links which are so narrow that at least three guide lugs 21 will always engage each wheel, whereby any sliding off of the tracks from the track wheels is prevented.

In this connection it is also possible to stress the advantage of arranging the track wheels unsprung as far as the above viewpoint is concerned. This advantage appears particularly from a comparison with an endless track vehicle with sprung track wheel when such a vehicle proceeds obliquely upward a hill side. In such a vehicle the sprung wheel tends to follow the track which recedes downwards but since the track hangs out sideways due to the oblique course of the vehicle on the hill side, the wheel will in this case escape from the guiding devices of the track, whereby the track will gradually slip off from the other wheels.

This will also be the case in constructions with wheels arranged on guiding bogies.

In both cases the prior art constructions also result in that the center of gravity of the vehicle is high.

By providing fixed, unsprung wheels and by journalling the driving sprocket shaft ahead of the track wheel and above a tangent to the tops of the wheels one also gains the advantage of obtaining full contact between the track guiding path on the pulled run and all the track wheels under all operation conditions.

By arranging, as previously mentioned, the rear wheel axles on a sliding frame displaceable in the longitudinal direction of the vehicle, for instance by means of a screw, the amount of tension of the track can be adjusted with regard to the distance between the track wheels and also to the actual terrain on which the vehicle is to process. One condition for such an adjustment possibility is that the wheels are unsprung.

The driving of each track by means of a sturdy sprocket which meshes with the grouser rods on the track links provides, as already mentioned, a very simple, robust and reliable actuating mechanism which is also power saving. In FIGURE 5 the power transmission from a driving sprocket 12 to a track 10 is schematically indicated. Also in this figure the same reference numerals as in the previous figures have been used. In the embodiment shown in the figure, the grouser rods 14 are assumed to be welded on the Ewart chair links half-way between their ends. This implies that the spaces between the sprocket cogs must be so deep that the reciprocal rotation movements of the Ewart chain links around the pivots 19 are not impeded by the movement of the grouser rods 14 in the cog spaces because otherwise the movement of the links would be overdriven and could result in damages on the track and the cog surfaces.

The sprocket 12 driving shaft 17 is coupled to the engine 22 in that the shaft is divided in the middle and connected to a crown wheel which, by means of hydraulic couplings can be coupled to either of the shaft ends and thus drive either the track 10 or 11. Said hydraulic couplings are arranged to be actuated by a control handle 23 shown in the driving cab 24 at the right hand in front of the driver's seat and which can be pushed forward by the driver so as to engage the right hand track thus causing the vehicle to turn to the left or pulled rearwards towards the driver in order to engage the left hand track 11 thus causing the vehicle to turn to the right. The next control handle 25 shown in the driving cab is provided for setting the vehicle in forward or rearward motion. Said control handle shifts a gear wheel in a hydraulic converter 27 which transmits the engine power to the driving shaft. The last control handle 26, located outermost to the left also controls a gear wheel in the converter 27 and provides the possibility of running the vehicle at low speed when pulled towards the driver and to run the vehicle at high speed when pushed away from the driver. Pedals 28 and 29 are provided for braking the right hand half of the driving shaft 17 and the left hand half of said shaft respectively. On the driver cab floor a tunnel 31 is indicated which is provided for the propeller shaft connecting the converter 27 to the crown wheel (not shown). Hydraulic cylinders 32 and 33 are provided for steering a trailer not shown on the drawing by means of steering wires 34 and 35 which are provided with shackles 36, 37 for the actuation of a draw bar (not shown) intended to be hooked up in a draw head. The driver's seat, not shown on the drawing, is preferably arranged on top of the converter 27. Protecting plates may also be suitably provided above the tracks.

As appears from FIGURE 2, the direction of movement of the Ewart chain links is opposite to what is usual as the chain is driven by sprocket cogs which mesh with the openings in said links. In the present case the direction of movement has been chosen so that the open parts of the sleeves 18 are not directed in the running direction of the track when driving forward.

The invention has been described with the reference to preferred embodiments. It is to be understood, however, that the invention is not to be construed as limited to preferred embodiments nor to precise constructional details. Such embodiments of the invention as come within the scope and purview of the appended claims are to be considered part of this invention.

What I claim is:

1. A lightweight cross-country endless vehicle with great tractive power comprising a vehicle body having a plurality of track wheels and a driving sprocket extending from each side thereof, crawler tracks trained around the track wheels and driving sprocket, each endless track including low carbon steel transverse grouser rods circular in section, links interconnecting the grouser rods, each link including a rectangular frame with a partially open sleeve on one end of the frame and a pin on the other end of the frame, the pin of one link being insertable sideways into the sleeve of an adjacent link so that the links are pivotally interconnected, each rod being slightly arched in the middle for matching the track wheel of the vehicle and being straight on each end, the straight end of each rod being welded to the sleeve of the corresponding link so that the center line of the sleeve lies in the same plane with the inside of the grouser rod arch crown.

2. A vehicle as in claim 1 in which the straight part of each grouser rod is welded to the rectangular frame of a corresponding link halfway between the sleeve and pin so that the driving stresses transmitted by the grouser rod are equally distributed between the sleeve and pin of the link.

3. A vehicle as in claim 1 further including a flat piece of steel welded to each link on the side thereof opposite the grouser rod, each piece of steel having a thickness to extend above the sleeve to protect the sleeve from being damaged by stones and prevent stones from being jammed in the link openings.

4. A vehicle as in claim 1 further including lugs welded to the side of each grouser rod which is opposite to the link so as to provide a guiding track for the sides of the track wheels.

5. A vehicle as in claim 1 in which the rearmost wheels of the plurality of track wheels constitute guide wheels and the remaining track wheels are of the same diameter as the rear wheels.

6. A vehicle as in claim 1 in which the driving sprocket meshes with the grouser rods of each track, and the driving sprocket has cogs with side surfaces which are arched so as to comply with the arch form of the grouser rods.

7. A vehicle as in claim 1 in which the center line of the driving sprocket is ahead of the wheels and at such a height above a tangent to the top of the wheels that the pulling run of the track, when idle, will follow a chain line from the driving sprocket to the penultimate or the antepenultimate wheel while the track run, when pulling, forms a chain line from the driving sprocket to the rear wheel.

8. A vehicle as in claim 1 in which the driving sprocket cogs have a depth such that chain links may freely rotate about their pivots without the grouser rods bottoming in the cog interspaces.

References Cited

UNITED STATES PATENTS

| | | | |
|---|---|---|---|
| 500,521 | 6/1893 | Wickers | 305—50 X |
| 892,740 | 7/1908 | Koob | 305—50 X |
| 3,013,843 | 12/1961 | Sinko | 305—32 X |
| 3,116,956 | 1/1964 | Maradyn. | |

FOREIGN PATENTS

| | | |
|---|---|---|
| 798,606 | 7/1958 | Great Britain. |
| 154,501 | 5/1956 | Sweden. |
| 181,714 | 11/1962 | Sweden. |

RICHARD J. JOHNSON, *Primary Examiner.*